Patented Aug. 4, 1931

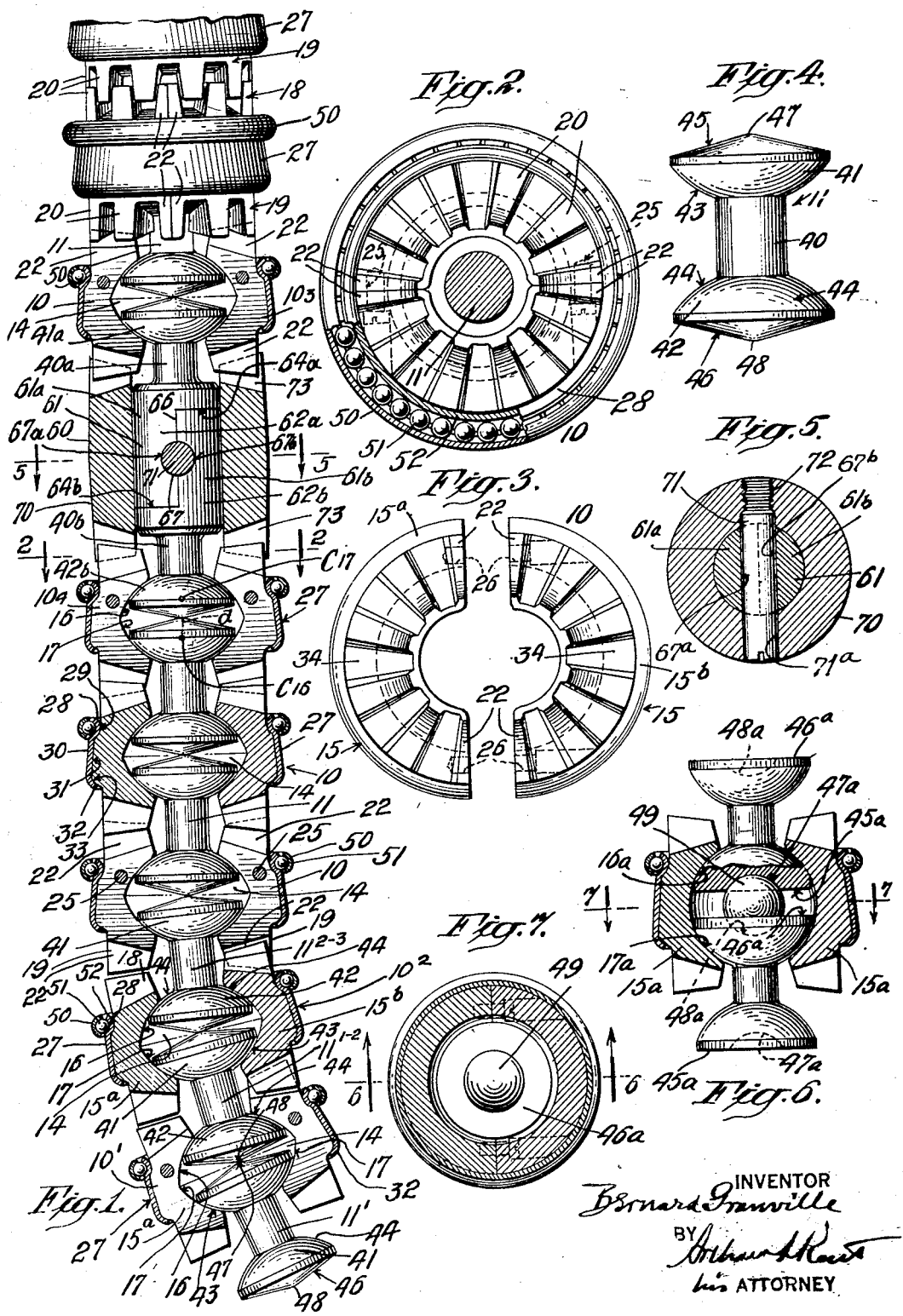

1,817,000

UNITED STATES PATENT OFFICE

BERNARD GRANVILLE, OF NEW YORK, N. Y., ASSIGNOR TO GRANVILLE HOLDING CORPORATION, A CORPORATION OF NEW YORK

FLEXIBLE SHAFT

Application filed April 5, 1926, Serial No. 99,699. Renewed October 13, 1930.

This invention relates to flexible shafts, and aims to provide a flexible shaft of simple construction and great strength.

An object of the invention is to provide a flexible shaft adapted to carry a heavy load without material loss in friction of the parts of the shaft when the shaft is used.

A further object of the invention is to provide a flexible shaft formed of small simple parts which may easily be manufactured, and which may be assembled without difficulty to provide a shaft of great strength.

A still further object of the invention is to provide a flexible shaft which may be enclosed in a flexible tube and the two drawn together through an elbow in the rigid pipe while the shaft is rotating, without injury to the flexible tube or shaft, and without friction between the flexible shaft and tube. The new flexible shaft is thus adapted for use in lateral drilling apparatus such as that shown in my U. S. Patent No. 1,367,042, as well as for many other uses.

A flexible shaft embodying the invention consists of a series of ring-shaped units connected together by short axial pins having heads with spherically curved surfaces engaging correspondingly curved surfaces in the rings. Torque is transferred from each ring to the next through crown gears formed at the ends of the rings and surrounding the middle parts of the connecting members.

A feature of the invention consists in the use of connecting pins which have heads permanently fixed at their ends, preferably made integral with the pins, and in forming each ring in two halves which are held together by the engagement of the gears of the ring with those of the adjacent rings.

This and other features of the invention, including a coupling for a flexible shaft, may best be understood from a detailed description of a practical flexible shaft embodying the invention, which is shown in the accompanying drawings, in which:—

Fig. 1 is a side view of a flexible shaft, partially sectioned on the plane of the axis of the shaft;

Fig. 2 is an enlarged transverse section of the shaft taken on the line 2—2 of Fig. 1, looking down;

Fig. 3 is a transverse section of the shaft taken on the line 2—2 of Fig. 1, looking up, omitting the connecting member, and showing the two halves of one of the rings separated;

Fig. 4 is an enlarged side view of one of the connecting pins;

Fig. 5 is a transverse section of the shaft coupling taken on the line 5—5 of Fig. 1;

Fig. 6 is a side view in axial section of part of a modified shaft adapted to resist end pressure; and Fig. 7 is a transverse section on the line 7—7 of Fig. 6.

The flexible shaft shown in Figs. 1 to 5 consists of a series of units 10 joined by connecting members 11. The units 10 are identical in construction and so are the connecting members 11. In Fig. 1, certain of the units are further identified by exponents "1" to "8", and certain of the connecting members by corresponding exponents, in order to facilitate referring to them individually in describing the assembling of the shaft.

Each unit 10 includes a diametrically split ring 15 having an enlarged central cavity 14 whose end walls provide opposite facing concave spherically curved surfaces 16, 17 whose centers of curvature $C_{16}$, $C_{17}$ are located on the axis of the ring and within the ring between its two ends. On the annular ends of each ring 15, are annular crown gears 18, 19. The internal diameter of the ring at its ends, as well as that of the gears, is materially less than that of the central cavity in the ring. The teeth 20 of each crown gear extend between two frusto-conical surfaces coaxial with the ring.

The plane on which each ring is divided bisects two diameterically opposite teeth 22 of each crown gear 18, 19 of the ring.

Three means are provided for holding together the two halves 15a, 15b of each ring 15. The first means consists of screws or pins 25 situated in corresponding bores 26 in the two halves. The principal function of these screws is to hold the two halves of the ring together during assembly, and to secure the proper relative position of the two halves, so that the portions of the gears and the spherical surfaces formed on each of the halves fit together accurately.

The second means of securing the two halves together is a rim 27 which surrounds the peripheral surface of the ring. The rim 27 has an inturned flange 28 fitting in against a circumferential shoulder 29 near the upper end of the ring, an outwardly tapered portion 30 fitting against the correspondingly tapered portion 31 on the periphery of the ring, and a flange 32 which is turned in over a circumferential shoulder 33 on the rim after the rim is applied to the ring, in order to prevent it from slipping off.

The third and most important means for holding together the two halves of each ring consists in so turning the adjacent rings of the shaft that each of the two split teeth 22 of each crown gear of the ring lies between two integral teeth of an intermeshing gear, that is, two teeth formed on the same half of one of the adjacent rings. This result may conveniently be secured by so forming each crown gear that it has recesses 34 ninety degrees from its split teeth 22, and by so assembling the rings that the dividing planes of alternate rings are at right angles to each other, as shown in Fig. 1.

Each connecting member 11 consists of a short heavy pin or rod 40 having at each end enlarged heads 41, 42 with their inner surfaces 43, 44 convex and spherically curved and of the same radius as the spherically curved concave inside surfaces 16, 17 of the rings. By making the heads 41, 42 integral with the pins 40, the connecting members may be made of great strength. They are preferably made of steel and hardened. The outer ends of heads 41, 42 have frusto-conical surface projections 45, 46 and spherically curved tips 47, 48.

In assembling the shaft, the heads of two of the connecting members $11^1$, $11^{1-2}$ are placed together with their curved tips 47, 48 in contact, and the two halves 15a, 15b and the split ring of a unit $10^1$ are brought together around these two heads so as to enclose them in the cavity 14 of the ring. A rim 27 is then slipped over the head 41 of the connecting member $11^{1-2}$, and over the split ring from above, and secured in position by turning in its flange 32. Another connecting member $11^{2-3}$ is then placed with its head 42 adjacent to the head 41 of the connecting member $11^{1-2}$ projecting from the upper end of the assembled unit $10^1$, and a second unit $10^2$ is then assembled about the heads of these two pins. In this way, the shaft may be built up from the bottom to any desired length. The terms "bottom, top" etc., have been used in reference to the position of the parts in Fig. 1 to simplify the description. It should be understood, of course, that the position of the shaft at the time when it is assembled and thereafter is immaterial. It is however essential that the tapering surfaces 31 of all the units of the shaft, or of a section of the shaft, be turned in the same direction, and that the assembling of the shaft begin at the end towards which the larger ends of the tapering surfaces are directed.

The proportions of the parts of the connecting members and rings may best be explained in connection with the assembled shaft shown in Fig. 1. The diameter of the pin 40 of each connecting member is less than the inner diameters of the rings at the ends of the rings and the inner diameters of the annular crown gears to allow a clearance for bending the shaft. The diameters of the heads 41, 42 of the connecting members are greater than the inner diameters of the rings at their ends, so that these heads cannot be removed from the enlarged cavities 14 of the rings after the units are assembled. The length of the pins 40 of the connecting members is sufficient to assure an engagement of the adjacent crown gears and to position the outer ends of teeth of one gear at some distance from the bottoms of the recesses in the co-operating gear when the shaft is straight, so that the teeth may not interfere with the bending of the shaft. The conical surfaces for the inner and outer ends of the teeth of each gear are so positioned that when the shaft is bent at the end of its maximum extent, as at the bottom of Fig. 1, the outer ends of the teeth are parallel to the bottoms of the recesses between the teeth of the co-operating gear of the side of the gear towards which the shaft is bent. In order to make the rings as short as possible, and thus give a greater flexibility to the shaft, the spherical surfaces 16, 17 have their centers C16, C17 located at the opposite sides from the middle plane of the unit from the surfaces themselves. Each of the centers C16, C17 is spaced from the middle plane of the ring by a distance $d$. The center of curvature of each of the spherical surfaces 43, 44 of a connecting member 11 are located at the distance $d$ beyond the ends of the tips 47, 48. The center of curvature of each tip 47, 48 is located at the distance $d$ in from the outer end of the tip. It follows that in the assembled shaft the spherical surfaces 16 of the unit $10^2$, 44 of the connecting member $11^{2-3}$, and 47 of the connecting member $11^{1-2}$, are concentric, as are also the surface 17 of the unit $10^2$, the surface 44 of the connecting member $11^{1-2}$, and the surface 48 of the connecting member $11^{2-3}$. The same relation holds with respect to the other units and connecting members. Consequently, the adjacent spherical tips of each two adjacent connecting members remain in contact with each other, but do not interfere when the shaft is flexed. For convenience in actual manufacture, it is usually desirable to provide for a slight clearance between the spherical tips and the adjacent pins.

The flexible shaft which has been described is adapted for use under conditions where it is not subjected to any material endwise compression. The purpose of the projections at the ends of the pin heads is merely to prevent rattling of the parts and to position the crown gears in proper relation when no tension is applied to the shaft. If the shaft is always under end tension when in use, these projections may be omitted.

When the shaft is to be subjected to any material degree of end-thrust while not in use, it may be modified as indicated in Figs. 6 and 7. In this modification, the opposite spherically curved surfaces 16a, 17a of each ring 15a have a common center of curvature so that they are parts of a single spherical surface. The projections 45, 46 at the outer ends of the heads of the connecting members are omitted, and instead the outer surfaces 45a, 46a are flat with central concave spherically curved recesses 47a, 48a for engaging a thrust ball 49 concentric with the surfaces 16a, 17a. Apart from these changes, the modified shaft is substantially identical with that first described.

In order to adapt the shaft for use in a tube, and to eliminate friction when it is so used, each split ring 10 is provided with a bearing ring 50 mounted on bearing balls 51. An inner race 52 for the balls 51 is formed in the flange 28 of the rim 27, so that, although the ring is split, the balls run on a continuous surface. The bearing rings 50 project laterally further than any other parts of the shaft, so that they alone come into contact with the inner walls of a tube in which the shaft may be placed. When the shaft is in a tube, therefore, each of its rings is mounted on a ball bearing.

In order that the length of the shaft may be varied without disassembling one of the split rings, the shaft may be provided at convenient intervals with couplings. The coupling 60 shown in Fig. 1 replaces a connecting member between the units $10^3$ and $10^4$, and also provides for transferring torque from one of these units to the other. The coupling 60 includes a special divided connecting member 61 having at its outer ends pins 40a, 40b and heads 41a, 42b similar to those of the standard connecting members 11 and co-operating with the rings of the units $10^3$ and $10^4$ in the same way. The central portion of the connecting member 61 consists of two cylinders 62a, 62b having stepped inner ends 64a, 64b. The diametrical sides 66 of the stepped ends contain cylindrical grooves 67a, 67b which form a transverse bore 67 through the center of the connecting member 61 when the stepped ends are placed together as shown in Fig. 1. The parts 40a, 41a, 62a and the parts 40b, 42b, 62b form two integral halves 61a, 61b of the connecting member 61. The two stepped ends of the central portion of the connecting member are held together by a sleeve 70, which surrounds the cylindrical portions 62a, 62b and a pin 71 which extends through a transverse bore 71a in the sleeve 70 and through the bore formed by the recesses 67a, 67b. One end 72 of the pin may be threaded to engage threads formed at one end of the transverse bore 71a in the sleeve. The ends of the sleeve 70 are provided with crown gears 73, or other means, for transferring torque from the lower crown gear of the unit $10^3$ to the upper crown gear of the ring $10^4$.

It is apparent that the shaft may be easily divided at the coupling 60 by removing the screw pin 71 and then separating the two parts of the connecting member 61 by withdrawing either or both of them from the sleeve 70. The ends of the shaft may be connected again with the same ease by first placing the sleeve 70 around the cylindrical portion 63 on one part of the connecting member 61 and then inserting the cylindrical portion 62 of the other part of the connecting member in the sleeve. The two parts of the connecting member are then pushed together within the sleeve to bring the crown gears of the units $10^3$, $10^4$ into engagement with the crown gears 73 of the sleeve, and to bring the cylindrical grooves 67, 68 into alignment with the transverse bore 71a. The pin 71 may then be inserted and screwed in.

Since no bending of the shaft is possible at the coupling 60, the external diameter of the sleeve 70 is made less than that of the bearing rings 50, so that the coupling does not interfere with drawing the shaft through an elbow.

When couplings are used, the shaft is assembled in sections, each of which terminates with one of the parts 61a or 61b of a connecting member 61. Thus in assembling the upper section of the shaft shown at the top of Fig. 1, the part 61a has its head inserted in the first unit of this section to be assembled, 10³, while in assembling the section of the shaft shown in the lower part of Fig. 1, the part 61b has its head inserted in the last unit to be assembled, 10⁴.

Many changes may be made in the specific apparatus described without departing from my invention, which includes many new individual features which may be used separately, as well as in the combination which has been described. The terms used to describe the various parts of the shaft in the specification and in the claims should be understood to include mechanical equivalents of the parts, and particularly the word "ring", which has been used as a convenient term to describe the principal element of the shaft units because they are circular and contain axial holes, should be understood not to imply any limitation as to the length or proportions of this element.

What is claimed is:

1. In a flexible shaft, the combination of two adjacent rings having co-operating annular crown gears and spherically curved surfaces with their centers of curvature spaced apart, and a connecting member having a rod extending through the crown gears and heads with spherically curved surfaces conforming to and engaging those of the rings.

2. In a flexible shaft, the combination of two adjacent rings having co-operating annular crown gears and oppositely facing concave spherically curved surfaces, and a connecting member having a rod extending through the crown gears and heads with convex spherically curved inner surfaces engaging the spherically curved surfaces of the rings.

3. A flexible shaft, comprising a series of rings, each of which has annular crown gears at its ends and contains a central cavity having two spherically curved surfaces whose centers of curvature are located within the ring, and connecting members, each of which has a rod extending through the adjacent gears of two adjacent rings and spherically curved heads fitting respectively against one of the spherically curved surfaces of each of said adjacent rings.

4. A flexible shaft, comprising a series of rings, each of which has annular crown gears at its ends and contains a central cavity having two opposite concave spherically curved surfaces, and connecting members, each of which has a rod extending through the adjacent gears of two adjacent rings and convex spherically curved heads fitting respectively against one of the concave spherically curved surfaces of each of said two adjacent units.

5. A flexible shaft, comprising a series of pins each having two heads with spherically curved inner surfaces and non-spherical outer surfaces, a series of rings each enclosing two adjacent pin heads and having spherically curved surfaces fitting the curved surfaces of the heads and lying as close together as the opposite sides of a sphere having the same curvature as said curved surfaces, and means to transfer torque from each ring to the next.

6. A flexible shaft, comprising a series of pins placed end to end, of which each has at each of its ends a head with a convex spherically curved inner surface and non-spherical outer surfaces, a series of rings, of which each encloses the adjacent heads of two adjacent pins and has concave spherically curved surfaces fitting against the curved surfaces of the heads and lying closer together than the opposite sides of a sphere having the same curvature as said curved surfaces, and means to transfer torque from each ring to the next.

7. A flexible shaft, comprising a series of rings having enlarged central cavities with oppositely facing concave spherical surfaces and a series of connecting members, each of which has a rod whose diameter is less than the internal diameter of the rings at their ends and two heads with convex spherically curved inner surfaces lying within the central cavities of two adjacent rings and of greater diameter than the internal diameter of the rings at their ends, and means independent of said connecting members to transfer torque directly from each ring to the next.

8. A flexible shaft, comprising a series of pins, each having two integral heads, a series of diametrically split rings each containing a single cavity having its greatest diameter at its middle and enclosing the adjacent heads of two adjacent pins, and means to transfer torque from each ring to the next.

9. A flexible shaft, comprising a series of pins, each having two integral heads with spherically curved surfaces, a series of diametrically split rings, each containing a cavity enclosing the adjacent heads of two adjacent pins and providing spherical surfaces fitting those of the heads, and crown gears at the ends of the rings to transfer torque from each ring to the next.

10. In a flexible shaft, a unit consisting of a diametrically split ring having a crown gear at each end and containing a central cavity having oppositely facing spherically curved surfaces, and a rim fitting around the periphery of said ring between said crown gears to hold its two halves together.

11. In a flexible shaft, a series of units each comprising a diametrically split ring, a rim fitting around the periphery of the ring and having a ball race in its outer surface, bearing balls engaging said ball race, and an outer bearing ring mounted on said bearing balls.

12. In a flexible shaft, a unit comprising a diametrically split ring having a tapered peripheral surface with an incut shoulder at its larger end, and a tapered rim fitting the tapered periphery of the ring and having a flange turned in over the shoulder of the ring.

13. In a flexible shaft section, a series of units each comprising a diametrically split ring having a tapered peripheral surface and a tapered rim fitting over said tapered surface, said rings being assembled with the larger ends of their tapered surfaces all pointing in the same direction.

14. A flexible shaft section, comprising a series of split rings having enlarged central cavities and tapered peripheral surfaces all turned in the same direction, a series of connecting members having enlarged heads enclosed in the central cavities of the rings, and tapered rims fitting the tapered peripheral surfaces of the rings and having internal diameters greater than the diameters of the heads of the connecting members.

15. A flexible shaft comprising a series of pins having integral heads, a series of diametrically split rings each containing a cavity enclosing the adjacent heads of two adjacent pins, and co-operative engaging means on the rings transferring torque from each ring to the next and holding the two halves of each ring together.

16. A flexible shaft, comprising a series of diametrically split rings having at their ends co-operating crown gears, each of which has a tooth formed partly on each half of the ring, and means for securing the rings together with the split tooth of each ring between two integral teeth of the next ring.

17. In a flexible shaft, a series of diametrically split rings having at their ends co-operating crown gears, the dividing plane of each ring being at an angle to that of the next ring.

18. In a flexible shaft, the combination of two co-operating diametrically split crown gears, in which each of two diametrically opposite teeth of each gear is divided by the dividing plane of that gear.

19. A member for connecting the units of a flexible shaft, comprising a rod having at each of its ends an enlarged head having an inner convex spherically curved bearing surface adapted for rotary movement and for a limited universal rocking movement against a correspondingly curved surface, and whose outer surface is non-spherical and lies materially inside the surface of a sphere containing the inner surface of the head.

20. A member for securing together the units of a flexible shaft, comprising a rod having at each of its ends an enlarged head with a convex spherically curved inner surface and a conical outer surface having a curved tip.

21. A member for securing together the units of a flexible shaft, comprising a rod having at each of its ends an enlarged head with a convex spherically curved inner surface and a conical outer surface having a spherically curved tip, in which the center of curvature of the inner surface of the head is located on the axis of the rod beyond the outer end of the tip and the center of curvature of the tip is located on the axis of the rod at the same distance inside the end of the tip.

22. A flexible shaft, comprising a series of rings each having a central cavity providing two opposite concave spherically curved surfaces, and a series of connecting members each having at each of its ends an enlarged head, which is enclosed in the central cavity of one of the rings, and has a spherically curved inner surface fitting one of the spherically curved surfaces of the central cavity of the ring and a conical outer surface with a rounded tip engaging the tip of the head of the adjacent connecting member.

23. A flexible shaft, comprising a series of rings each having a central cavity providing two opposite concave spherically curved surfaces, and a series of connecting members each having at each of its ends an enlarged head, which is enclosed in the central cavity of one of the rings and has an inner convex spherically curved surface fitting one of the spherically curved surfaces of the central cavity of the ring, and co-operative engaging means at the outer ends of adjacent heads to space the adjacent heads of each two connecting members apart so as to hold their spherical surfaces in contact with those of the ring which encloses them.

24. The combination with a flexible shaft having units and means for connecting them together, of a coupling interposed between two units and comprising a connecting member with separable ends enclosed within said two units respectively, and removable means surrounding said connecting member and transferring torque between said two units.

25. The combination with a flexible shaft having units and means for connecting them in series, of a coupling interposed between two units and comprising a connecting member having two separable parts engaging said two units respectively, a removable sleeve surrounding said connecting member and serving to transfer torque between said units, and a single locking means adapted to prevent separation of the two parts of the connecting member and removal of the sleeve therefrom.

26. A flexible shaft, comprising a series of pins each having two integral heads with spherically curved inner surfaces, a series of diametrically split rings each containing a cavity enclosing the adjacent heads of two adjacent pins and having spherically curved surfaces fitting those of the heads, and means for transferring torque from each ring to the next, the pins being free to rotate relatively to the rings and to have a limited universal rocking movement.

In testimony whereof I have hereunto set my hand.

BERNARD GRANVILLE.